May 2, 1961 R. F. CHAMBERS 2,982,593

TELEPHONE ENCLOSURE

Filed March 6, 1958 3 Sheets-Sheet 1

INVENTOR.
Ralph F. Chambers
BY
Mead, Browne, Schuyler & Beveridge
ATTORNEYS

TELEPHONE ENCLOSURE

Filed March 6, 1958 3 Sheets-Sheet 2

INVENTOR.
Ralph F. Chambers
BY
Mead, Browne, Schuyler & Beveridge
ATTORNEYS

May 2, 1961 R. F. CHAMBERS 2,982,593

TELEPHONE ENCLOSURE

Filed March 6, 1958 3 Sheets-Sheet 3

INVENTOR.
Ralph F. Chambers
BY
Mead, Browne, Schuyler and Beveridge
ATTORNEYS

United States Patent Office 2,982,593
Patented May 2, 1961

2,982,593

TELEPHONE ENCLOSURE

Ralph F. Chambers, Decatur, Ga., assignor to Gladwin Plastics, Inc., a corporation of Georgia Filed Mar. 6, 1958, Ser. No. 719,579

11 Claims. (Cl. 312—223)

The present invention relates to a telephone enclosure and more particularly to an easily installed relatively small, partial booth for a public telephone.

Of course, the ubiquitous telephone is one of the signs of our times. However, the conventional, full length, user-occupied telephone booth is expensive, bulky, and otherwise unsuitable for use at many locations where a telephone is essential for the general public health, welfare, and safety. For example, when the business houses in general public service of any large city close at the end of a day's work, there is no telephone service available to pedestrian traffic by which a pedestrian may obtain medical aid, make personal or business arrangements, or call for law enforcement assistance. The vast majority of public telephones are installed in stores, office buildings, and the like, and the installation of a conventional public telephone booth on a crowded city sidewalk is not practical.

Recently, a relatively small number of public telephone user-occupied booths have been installed along main highways. However, an enormous flow of the motor traffic is necessary to pay for the booth and its installation. Consequently, such installations are few and far between and are concentrated upon main vehicular routes.

There never seem to be enough telephone booths to fulfill the needs of the general public inside business establishments, railroad and airline terminals, bus depots, and the like. Once again, the cost and space requirements for conventional booth installations require such a degree of usage that the provision of a truly adequate number of telephones is economically unfeasible.

The present invention now provides a novel, relatively small, inexpensive partial phone booth for housing a public or coin-collector telephone, and which occupies a minimum space, requires a minimum initial cost of the unit and for its installation, and requires minimum maintenance. As a result, improved public telephone service is available and the telephone industry is relieved of its existing burdens of initial high cost and constant costly maintenance inherent in the present methods of providing telephone service to the general public.

Generally, the present invention contemplates the provision of a partial telephone booth which actually is an enclosure for housing a coin-collector telephone to protect the telephone against the elements and to facilitate utilization of the telephone by the general public. The enclosure preferably includes a housing which encloses the telephone and a rather limited surrounding area to protect the telephone and to provide a receptacle for a telephone directory. This housing or casing may, obviously, be formed of any desirable sheet materials, such as metal, wood, or the like, although a transparent plastic material is preferred to expose the telephone to view by the public and to form a more attractive enclosure.

The housing or casing is surmounted by a translucent shroud or dome enclosing a light for illuminating the interior of the housing and the telephone contained therein and also to give a visual indication of the provision of the telephone for public use. Generally underlying the housing is an enclosed receptacle for containing the various electrical relays, connections, etc., necessary for installation of the telephone. Access to this receptacle is provided, preferably through a pair of bottom-opening doors, to facilitate initial installation and subsequent maintenance of the telephone.

In a preferred embodiment of the invention, the telephone is installed upon a vertically extending rigid backing element which serves to support the telephone and to secure together the lower receptacle, the telephone-enclosing housing, and the light-enclosing shroud. The receptacle also provides a mounting socket adapted to receive a supporting post upon which the complete partial booth assembly is disposed. This socket may receive a mounting stud on a wall-mounted bracket, a post-mounted bracket, or the like, or the socket may be mounted upon the free upper end of a pedestal or post anchored in the ground or in a concrete footing.

It is, therefore, an important object of the present invention to provide an easily installed, relatively small, inexpensive partial booth for a public telephone.

Another object of this invention is the provision of a telephone enclosure for a coin-collector telephone to protect the telephone against the elements while occupying minimum floor or ground space.

A further main object of this invention is the provision of a telephone enclosure wherein a coin-operated telephone is exposed to view, is illuminated by an overhead light, and is supported from a suitable support.

Still another object of the present invention is the provision of a telephone enclosure in which a backing element extends vertically between an overhead light and an underlying equipment cabinet to support a telephone in a medial position for ready access through an open side of an enclosing casing.

It is yet another fundamental object of this invention to provide a telephone enclosure adapted for mounting upon or suspension from a variety of supporting means to occupy a minimum space while protecting a coin-collector telephone from the elements and while providing a storage facility for a telephone directory, the telephone and directory being exposed to view and illuminated for night-time identification and use.

Other objects and advantages of the invention will appear from the following detailed description taken in conjunction with the annexed drawings, in which:

Figure 1:
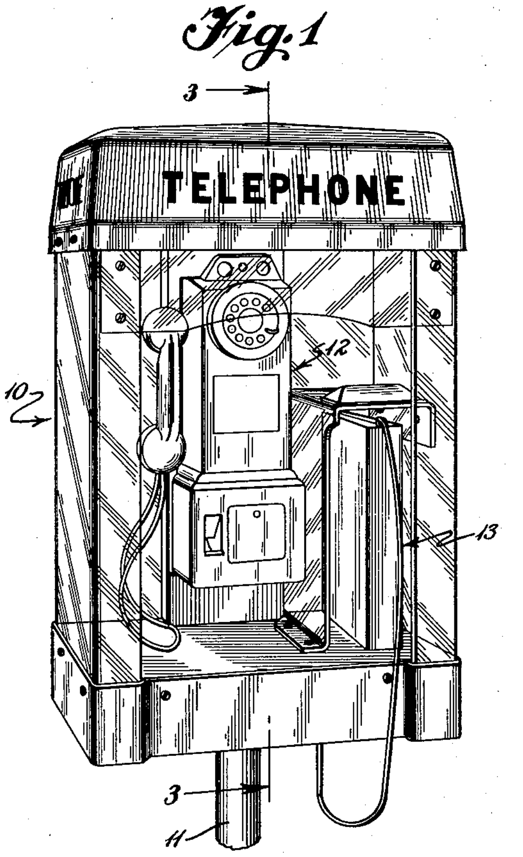
Figure 1 is an elevational perspective view illustrating a telephone enclosure of the present invention with a telephone and directory enclosed thereby.

In Figure 1, reference numeral 10 refers generally to a telephone enclosure of the present invention supported upon the upper end of a lower supporting post 11 and adapted to retain in operative vertical position a coin-collector telephone indicated generally at 12 and a telephone directory indicated generally at 13, The structure of the telephone enclosure is best illustrated in perspective views 2 and 4. Incorporated integrally into the telephone enclosure structure is a metal equipment cabinet indicated generally at 15 in Figures 2 and 4 and comprising an upper support or writing surface 16 surrounded by a depending circumferential flange defining side walls 17 and end walls 18. The side and the end walls are joined to one another by suitable means, as by welding, and define an interior space 19 adapted to be closed by a pair of downwardly swingable doors 20 secured to the lower marginal portions of the depending side walls 17 by suitable means, as by elongated piano-type hinges 21.

The rear end wall 18 (as viewed in Figure 4) is provided with an inturned, horizontally extending terminal flange 22 provided with a pair of threaded apertures 23 located medially thereof. Similar threaded apertures 24 are provided in the under surface of front wall 18. These apertures 23 and 24 are adapted for alignment with corresponding apertures 23a and 24a, respectively, formed in each of the doors 20, and are adapted to receive tamper-proof pin-and-socket steel screws, such as screws 25 (Figure 3).

Also, it will be noted that the doors 20 are each provided with a cut-out or recess 26 adjacent the depending extremities thereof. These recesses accommodate the passage through the closed doors of a depending tubular mounting extension 27 welded or otherwise secured to the under surface of the top plate 16 of the equipment cabinet 15. The mounting extension 27 is provided with a plurality of radial apertures 28 preferably interiorly tapped or threaded for receiving set screws 29 during installation of the enclosure or booth 10. The depending extension 27 is of such size as to be telescopically received by the tubular post 11 (Figure 1), and the set screws 29 projecting radially through the post apertures retain the extension 27 in position within the post 11. Typical set screws 29 are illustrated in Figure 3 of the drawings.

Each of the swinging doors 20 carries thereon a back board 30, preferably of wood, upon which various installation facilities for the telephone 12 may be mounted. For example, one such board may accommodate the mounting of a sub-set installation, while the other such board may be utilized for mounting the telephone protector and analogous equipment.

Figure 3:
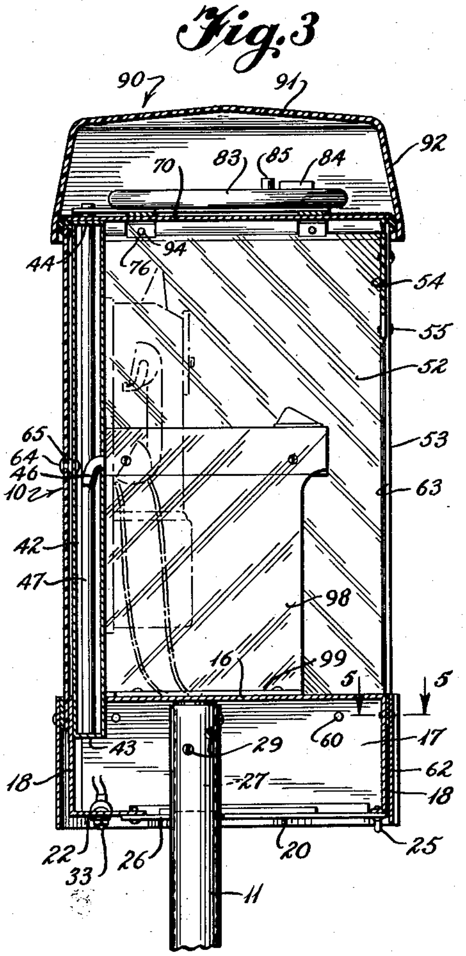
Figure 3 is an enlarged vertical sectional view taken along the plane 3—3 of Figure 1.

The flange 22 is exposed, even when the doors 20 are in their closed positions of Figure 3. Accordingly, the flange 22 is provided with a pair of apertures 31 and 32 for accommodating the entry of telephone service wires or leads and light service wires or leads, respectively. The flange 22 also carries a centrally located ground stud 33 for grounding the telephone set and/or sub-set, as may be required. Also mounted on the flange 22 to be superimposed thereover is a push button light switch 34 accessible through a flange aperture 35. This push button light switch may be utilized to turn off a dome light or other illuminating means for the telephone as may be required for civil defense blackout purposes.

Figure 2:
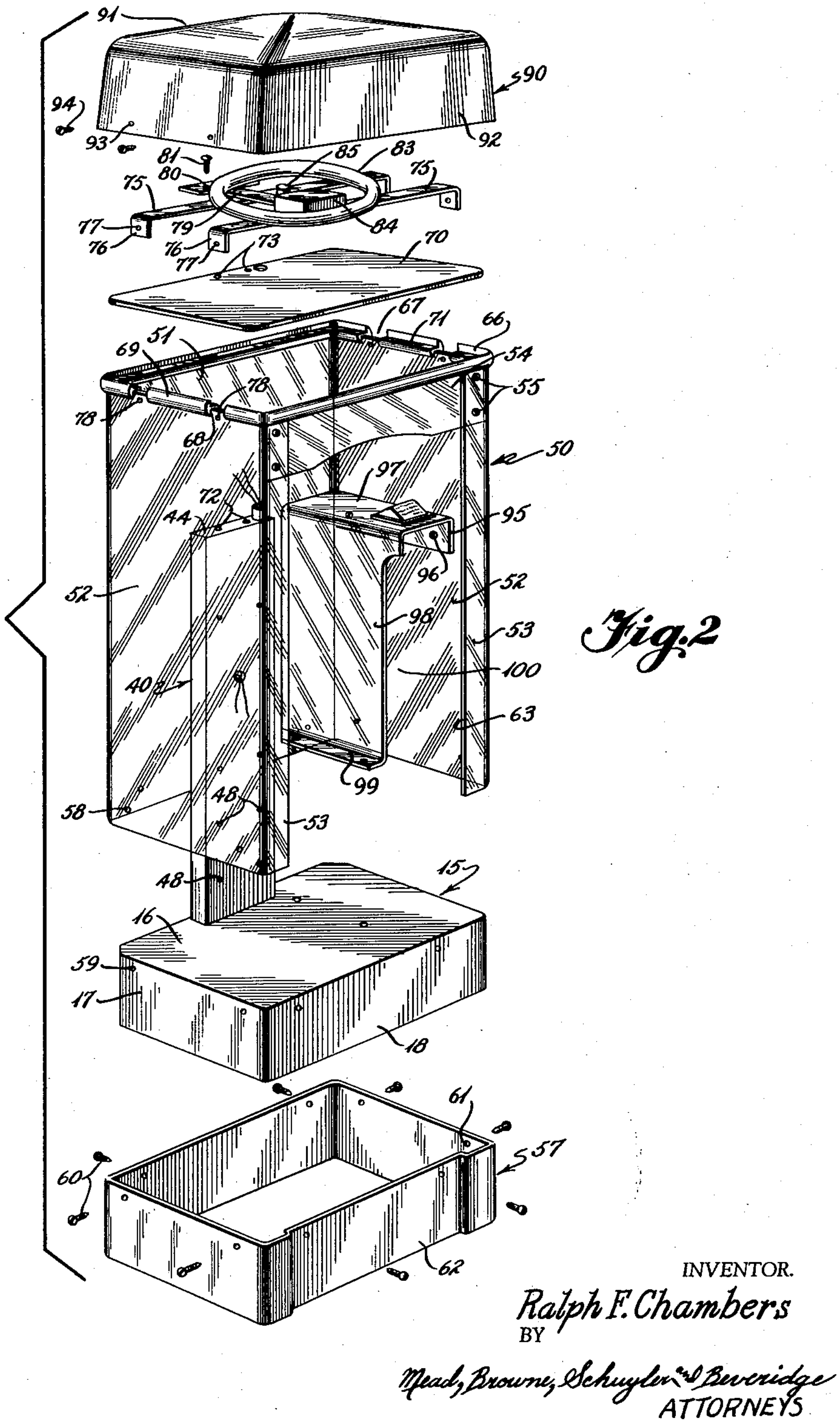
Figure 2 is an exploded perspective view similar to Figure 1, but with the telephone and directory removed.
Figure 4:
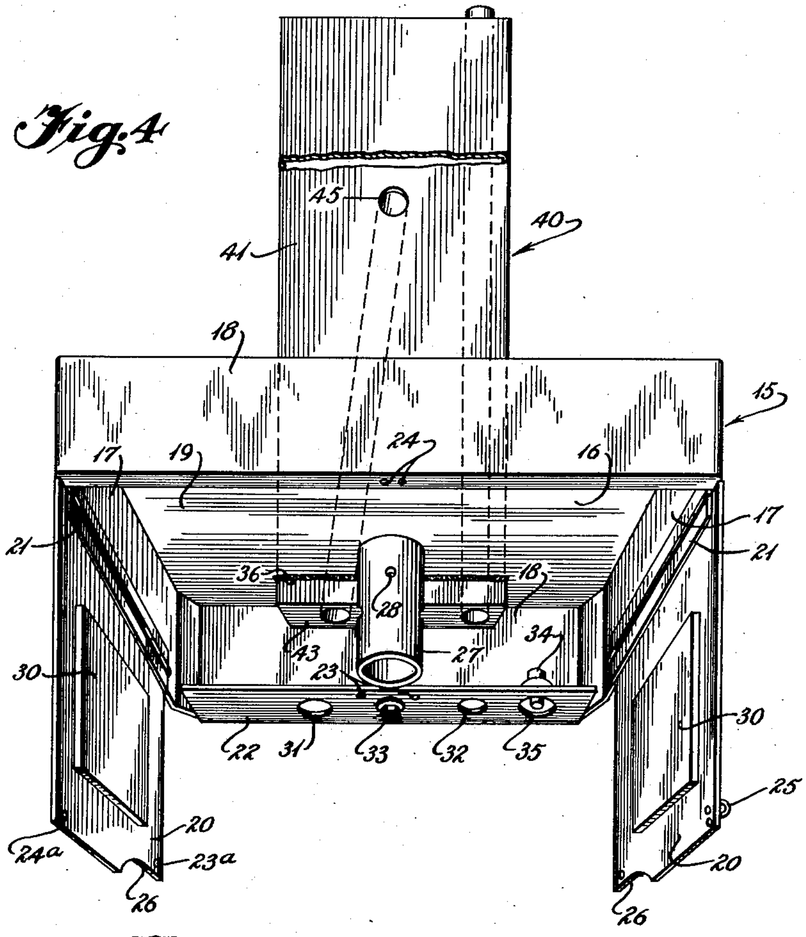
Figure 4 is a fragmentary bottom perspective view illustrating the equipment cabinet in an opened condition.

Projecting through a hole 36 in the upper cabinet plate 16 is a vertically extending backing element or telephone-support box 40 (Figures 2, 3 and 4). This support element 40 is actually a welded steel hollow box having peripheral walls 41 enclosing an interior hollow space 42, the vertical ends of the hollow space 42 being closed by end plates 43 and 44 located at the bottom and the top, respectively of the box. The bottom plate 43 is apertured for communication with a tubular conduit 46 extending generally vertically of the box and opening through the forward side walls thereof, as at aperture 45. A second vertically extending conduit 47 communicates through both the bottom plate 43 and top end plate 44 for carrying a light wire, as hereinafter more fully explained. The forward side wall of the box 40, namely that wall provided with the aperture 45 is also provided with a plurality of relatively smaller threaded apertures 48 adapted for mounting the coin-collector telephone to the side wall of the box.

Superimposed upon the equipment cabinet 15 and in surrounding relation with the upper extremities thereof and with respect to the upstanding backing element 40 is a shield or casing indicated generally by reference numeral 50. This shield 50 is preferably formed of a transparent plastic, so that the telephone 12 may be readily viewed therethrough. Suitable plastic materials include methyl methacrylate, vinyl polymers or copolymers, methyl or ethyl cellulose, or the like. In the event that the transparent character of the shield is not necessary or is undesired for any reason, the shield may be formed of any suitable material, such as a metal, a translucent or opaque plastic material, fibre or paperboard, or the like. The shield is preferably formed in one piece and comprises a medial or back panel 51, a pair of identical side panels 52, and partial front panels 53. These front panels 53 are actually inwardly directed terminal flanges lying parallel to the medial or back panel 51 and substantially normal to the side panels 52. The front panels or flanges 53 are joined through the medium of an upper insert 54, also preferably formed of plastic and joined to the flanges by suitable means, as by rivets, bolts, and the like 55.

Figure 5:
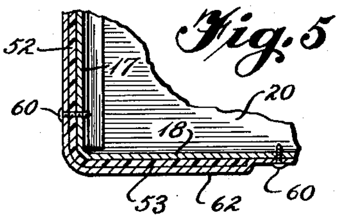
Figure 5 is a fragmentary sectional view taken along the plane 5—5 of Figure 3.

The lower extremities of the shield 50 are interposed between the upper extremities of the steel equipment cabinet and a peripheral band 57 adapted to surround the equipment cabinet. Preferably, this band is formed of an anodized aluminum composition and provides a decorative cover for the steel equipment cabinet 15 while at the same time serving to secure the shield 50 in position. The shield 50 is provided with a plurality of spaced apertures 58 around the lower periphery thereof for registry with tapped holes 59 formed in the side and end walls 17 and 18 of the equipment cabinet 15. These holes receive screws 60 projecting through apertures 61 formed in the band 57. It will be particularly noted from Figure 5 that the forward medial portion 62 of the peripheral band 57 is recessed because of the occurrence of the shield opening 63 defined by the spaced termination of the shield front flanges 53. This lends an additional decorative touch to the peripheral band 57 and enhances the appearance of the assembly.

The shield 50 is further secured in position by one or more rivets 64 projecting through the medial side 51 of the shield, a washer 65 interposed between the shield and the supporting box 40, and the rear wall of the box 40, all as illustrated in Figure 3 of the drawings.

The free upper terminal peripheral edge of the shield is generally rectangular in outline, except for the opening 63 defined between the flanges 53. The intermediate plate 54 terminates below these free upper edges, as illustrated in Figure 3. These upper edges are provided with a peripheral elastomeric gasket 66, this gasket having a downwardly facing groove 68 therein defined by transversely spaced gasket legs and adapted to straddle the free upper edges of the shield. An arcuate peripheral wall 69 of substantial vertical extent is provided to encircle the shield upper extremities, this wall having gaps 67 therein to accommodate fastening means, as hereinafter more fully described.

Superimposed upon and supported by the gasket and the upper closure plate 44 of the backing element 40 is a combination ceiling and light diffuser plate 70. This plate is of generally rectangular outline and rests upon a shelf 71 defined by the gasket in vertical alignment with the side walls of the shield 50. Further, the plate 70 bears upon the backing element 40 to be secured thereto by suitable means, hereinafter described, extending through registering apertures 72 and 73 formed in the closure plate 44 and the diffuser plate 70, respectively. Superimposed upon the diffuser plate is a light bracket comprising a pair of cross pieces 75 having terminal down turned flanges 76 at each extremity thereof. When the bracket is resting upon the diffuser plate 70, the straps 75 rest upon the plate with the flanges 76 thereof depending through the gaps 68 in the gasket 66 so that flange apertures 77 register with apertures 78 formed in the shield 50 adjacent the upper periphery thereof. A third rearwardly projecting bracket strap 79 is provided, this strap having apertures 80 therein adapted to receive screws 81 depending through the registering apertures 73 and 72 formed in the diffuser plate 70 and the box closure plate 44, respectively. Thus, the bracket is secured to the backing element 40 and also serves to secure the diffusion plate 70 thereto.

Superimposed upon the light bracket to be supported thereby is the source of illumination, such as a fluorescent bulb 83 provided with a ballast 84 and a starter 85. Obviously, other light sources, such as incandescent bulbs or the like, may be utilized.

Superimposed upon the entire assembly 10 is a dished dome or cover 90. This dome 90 comprises a generally rectangular upper portion 91 and a depending peripheral skirt 92. The interior surface of the peripheral skirt 92 engages the curved exterior surface 69 of the peripheral gasket 66 and opposite marginal portions of the skirt are provided with spaced apertures 93 alignable with apertures 78 in the shield to receive therethrough suitable fastening elements, such as rivets 94 or the like.

This dome 90 forms a significant part of the assembly of the present invention, inasmuch as it surmounts the entire assembly and comprises an appreciable portion thereof. Preferably this dome, and more particularly the skirt 92 thereof, bears indicia, such as the legend "Telephone." Additionally, the dome is preferably made of a translucent material, such as a desirable plastic material, and may be painted, pigmented, or otherwise treated so as to provide a distinctive appearance for the assembly.

In a preferred embodiment of my invention, the dome is made of a clear plastic material interiorly sprayed uniformly with the desired color, such as red, white or blue with the legend "Telephone" being imprinted thereon in a contrasting color. A sprayed coat of yellow paint is then sprayed inside the cover. Inasmuch as the source of illumination, namely, the bulb 83, is disposed interiorly of the dome, the dome will be lighted from the inside. In the absence of illumination, as during the day time, the initially applied sprayed color of the dome will be readily visible with the contrasting legend. However, an entirely different appearance is presented at night when the internal bulb is lit. The yellow color of the interior spray coat is then visible. Such a yellow top does not attract bugs and flying inserts, thus avoiding the inconvenience to and discouragement of potential telephone users because of the presence of such insects.

Another novel feature is provided by the presence of a directory receptacle located interiorly of the housing 50. This receptacle is provided by a single sheet of clear plastic or the like having a first terminal flange 95 secured, as by rivets 96, to the interior surface of one of the side sheets 52 of the housing 50. An integral upper flange 97 merges with a depending side flange 98 provided with a terminal flange 99 secured by suitable means, as by screws or the like, to the upper surface of the steel equipment cabinet cover 16. Thus the adjacent side wall 52 of the housing 50 cooperates with the elongated directory container leg 98 to provide a generally rectangular interior space 100 into which a directory may be readily inserted. Preferably, the upper flange 97 of this directory holder bears an imprinted legend 101 admonishing users to utilize the receptacle provided for the directory. For example, this legend 101 might read "Replace Directory Here."

Figure 6:
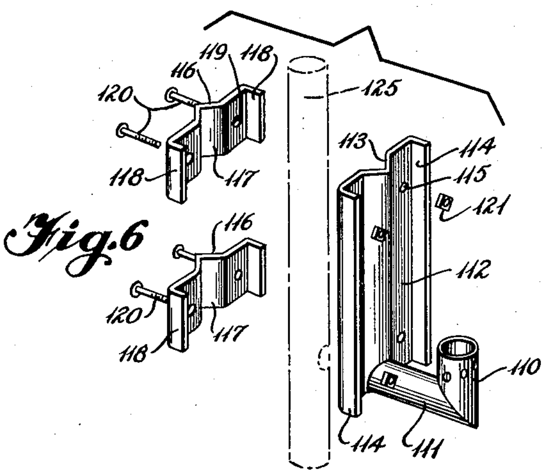
Figure 6 is an exploded sectional view of a mounting bracket for the telephone enclosure.

The installation of a telephone enclosure such as that hereinbefore described is quite simple. For example, as illustrated in Figure 6, a bracket-type installation upon a vertical pole, such as a light pole, telephone pole, sign pole, or the like, can be utilized. In this mounting, the mounting stud 27 heretofore described is again utilized, the stud being telescopically received by an upstanding pipe 110 joined through a horizontal reach of pipe 111 to a first bracket element 112. This bracket element 112 is a stamped unit having a central V-shaped recess 113 adapted to receive therein the periphery of a pole 125. This stamped assembly is rigidified by a pair of integral deflected terminal flanges 114 and a plurality of bolt holes 115 traverses the thickness of the bracket to either side of the recess 113. A pair of individual attachment bracket elements 116 is provided for cooperation with the primary bracket element 112, these partial brackets each having a central recess 117 therein, terminal flanges 118 spaced from one another a distance greater than the distance between the flanges 114 and adapted to receive said flanges 114 therebetween, and transverse apertures 119 adapted to register with the apertures 115 and to receive therethrough suitable attaching means, such as bolts 120. The insertion of the bolts 120 through the registering apertures 115, 119 and tightening of the nuts 121 will draw the brackets into telescoped assembly with the pole 114 interposed therebetween. Such support distributes the load axially over that extent of the pole 114 embraced by the brackets and provides a readily assembled, sturdy, and effective mounting means for the booth assembly 10.

Figure 7:
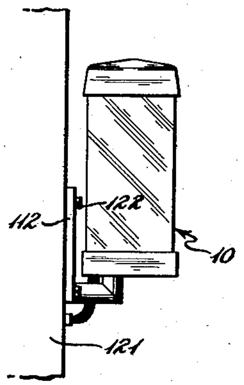
Figures 7 and 8 are diagrammatic illustrations of typical telephone enclosure installations.
Figure 8:
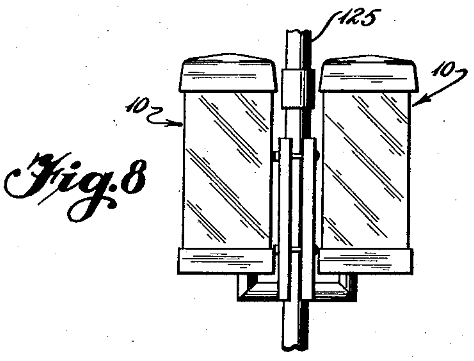

Modified forms of bracket mountings are illustrated in Figures 7 and 8. Both types of mountings use brackets substantially the same as those illustrated and described in the embodiment of Figure 6. In Figure 7, a wall-type mounting is disclosed wherein only the primary bracket element 112 is utilized, this bracket being secured to the wall 121 by suitable means as by bolts 122. Once again, in Figure 8, a pair of attachment brackets 112 are utilized for mounting two booths 10 upon a common center pole 125.

From the foregoing detailed description, it will be appreciated that the present invention provides a small housing or enclosure for a coin-collector telephone. Several features of the present invention deserve additional notice. For example, the utilization of a wrap-around housing formed of clear plastic on all four sides without obstructing corner posts and/or edging provides complete visibility for the telephone from all directions, thus eliminating any question as to the purpose of the booth, while at the same time providing a distinctive and desirable appearance. The dome or cover 90 is distinctive in appearance, provides differential coloration during day and night time use, prevents the attraction of insects, and, in combination with the gasket 66, provides a weather-tight and weather-resistant cover for the entire assembly.

The provision of the interior lighting element 83 and the diffuser plate 70 illuminates the interior of the housing from above, providing ready visibility for the user of the telephone, providing a ready identification of the telephone booth as such, and also illuminates the dome. The lower equipment cabinet is encased within the decorative band 57, thus further imparting pleasing appearance to the assembly. The utilization of lower drop doors for access to the equipment cabinet prevents tampering with the equipment cabinet and the electric connections therein by unauthorized personnel, while still providing ready access for maintenance, inspection, and the like. When the doors are closed, all of the equipment and wiring is fully enclosed, while the mounting socket projects through the doors so that the socket-bracket or pole mounting is completely encased to prevent unauthorized removal of the booth. Additionally, the utilization of the push-button switch affords ample protection for civil defense purposes and the like while still rendering difficult the turning off of the light by unauthorized persons.

The backing column or element 40 is hollow so as to channel the telephone installation lines and light lines directly to their destination while at the same time completely concealing these wires from public view. Further, this backing element serves as the backbone of the entire assembly and carries all of the assembly as an integral unit. Thus, a rigid "backbone" is provided for the assembly to resist wind damage and other accidental or elemental forces imposed thereon.

While preferred embodiments have been described above in detail, it will be understood that numerous modifications might be resorted to without departing from the scope of the invention as defined in the following claims.

What is claimed is:

1. A telephone enclosure comprising a lower equipment cabinet having spaced-apart side walls and a rear end wall extending between said side walls, an upstanding rigid backing element carried by said cabinet to project upwardly therefrom at a location adjacent said rear end wall and between said cabinet side walls, said backing element being adapted to support a telephone thereon, a continuous casing partially peripherally lapping the cabinet and partially enclosing said backing element and the telephone thereon in spaced relation thereto, a dome overlying and telescopically receiving the free upper extremities of said casing, and means securing said casing to said cabinet and to said dome.

2. A telephone enclosure comprising a vertically extending rigid backing element, lighting means carried by said element at the upper extremity thereof, a translucent cover carried by said element to enclose said lighting means, a horizontal platform secured to the lower extremity of said backing element, support means located medially of said platform on the under side thereof for securing said enclosure to a support surface, a housing bridging the cover and the platform to at least partially enclose the space therebetween, a peripheral gasket carried by said housing and contacting said cover, the backing element being adapted intermediate said lighting means and said platform to support a telephone at least partially enclosed by said housing, electrical wiring carried by said backing element for both said telephone and said lighting means, and a translucent panel interposed between said lighting means and the telephone to define a ceiling for said space.

3. A telephone enclosure comprising a lower equipment cabinet having an upper shelf surface, and downwardly extending side and end walls defining, together with said shelf surface, a storage space underlying said shelf surface, closure means affording access to said storage space and depending support means secured to said shelf surface and projecting downwardly from said shelf surface, an upstanding rigid backing element carried by said cabinet to project upwardly therefrom at a location adjacent a cabinet end wall and between cabinet side walls, said backing element being adapted to support a telephone thereon, a casing partially peripherally enclosing said backing element in spaced relation thereto, a cover telescopically receiving the free upper extremities of said casing and superimposed thereon, and bracket means for engagement with said depending support means to secure the enclosure to a support element disposed exteriorly of said enclosure.

4. An enclosure for a telephone or the like comprising a substantially horizontal rectangular base, a vertically extending hollow rigid backing element secured to said base adjacent a peripheral edge thereof, a cover carried by said element in spaced relation to said base, the base and cover being of substantially the same size and contour and in registry with one another, a peripheral casing secured to said cover and said base to extend therebetween, and support means on the under side of said base for securing said enclosure to a support, the backing element being adapted intermediate said cover and said platform to support a telephone substantially surrounded by said casing and to house wiring for said telephone, and said casing having an opening therein for affording access to the telephone.

5. An enclosure for a telephone or the like, comprising a lower equipment cabinet, an upstanding rigid hollow backing element located adjacent said cabinet and projecting upwardly with respect thereto, said backing element being adapted to support a telephone thereon, a casing partially peripherally enclosing said backing element in spaced relation thereto, lighting means, and a translucent cover receiving the free upper extremities of said casing and superimposed over said lighting means, said upstanding rigid hollow backing element including means for leading electrical wiring through the hollow interior of said backing element to said lighting means and the telephone, respectively.

6. A telephone enclosure comprising a vertically extending rigid backing element, a bracket superposed on said element and rigidly secured thereto, an upper translucent dome secured to said bracket, a horizontal platform secured to the lower extremity of said backing element the backing element being located adjacent one extremity of said platform, support means located medially of said platform on the under side thereof for securing said enclosure to a support, and a casing extending vertically from said dome to said platform and secured to said bracket and said platform to substantially enclose the space therebetween, the backing element being adapted intermediate said dome and said platform to support a telephone and said casing having an opening therein in opposing relation to said backing element for access to the telephone supported by said element.

7. An enclosure for a telephone or the like, comprising a lower equipment cabinet having an upper shelf surface, and downwardly extending side and end walls defining, together with said shelf surface, a storage space underlying said shelf surface, and closure means affording access to said storage space, an upstanding rigid backing element projecting upwardly with respect to said cabinet at a location adjacent a cabinet end wall and between cabinet side walls, and adapted to support a telephone thereon, a casing partially peripherally enclosing said backing element in spaced relation thereto, and a cover carried by said backing element to overlie said casing and telescopically receiving the free upper extremities of said casing.

8. An enclosure for a telephone or the like, comprising a lower equipment cabinet having an upper shelf surface, a storage space underlying said shelf surface, and downwardly opening doors hinged to said cabinet to afford access to said storage space, an upstanding rigid backing element carried by said cabinet to project upwardly therefrom, and adapted to support a telephone thereon, a casing partially peripherally enclosing said backing element in spaced relation thereto, and a cover telescopically receiving the free upper extremities of said casing and superimposed thereon.

9. An enclosure for a telephone comprising a vertically extending rigid backing element, a cover carried by said element, a horizontal platform secured to the lower extremity of said backing element, a housing interposed between said platform and said cover to at least partially enclose said backing element, a depending support stud carried by said platform on the under side thereof, the backing element being adapted intermediate said cover and said platform to support a telephone, and mounting means for said enclosure including bracket means for attachment to a support and a tubular extension on said bracket means receiving said support stud.

10. An enclosure for a telephone or the like, comprising a lower equipment cabinet, a rigid backing element secured to said cabinet to project upwardly therefrom, and adapted to support a telephone thereon, a one-piece casing peripherally enclosing said backing element in spaced relation thereto and having an access opening opposing the telephone, a dome partially telescoped over free upper extremities of said casing, means securing said dome to said backing element, and means securing said casing to said dome and to said cabinet and including a peripheral band encircling said cabinet and the lower extremity of said casing.

11. A telephone enclosure comprising a substantially horizontal platform, a dome member spaced vertically above said platform, lighting means located within said dome member, a partial casing extending vertically between said dome member and said platform and defining, together with said dome member and said platform, a hollow interior having a front opening providing access thereto, a rigid backing member extending vertically from said platform to said dome member adjacent the inner surface of the rear wall of said casing, said backing member being adapted to support a telephone and including means to lead wiring to a telephone supported on said backing member and means to lead wiring to said lighting means, and an equipment cabinet located beneath said platform.

References Cited in the file of this patent

UNITED STATES PATENTS

| | | |
|---|---|---|
| 1,779,482 | Martin | Oct. 28, 1930 |
| 1,817,062 | Byrnes | Aug. 4, 1931 |
| 1,994,186 | Anderson | Mar. 12, 1935 |
| 2,215,799 | Sherron | Sept. 24, 1940 |
| 2,598,957 | Wolfe | June 3, 1952 |
| 2,678,705 | Haines | May 18, 1954 |
| 2,749,429 | Wavell | June 5, 1956 |
| 2,957,739 | Fisher | Oct. 25, 1960 |

OTHER REFERENCES

Hose McCann Telephone Co., Burgess Acoustic-Booth 602, pg. 13, November 1950.

Stile Industries (Italian), Des. No. TS 14958 pg. 39, April 1957.